April 26, 1938.  W. W. GARSTANG  2,115,163
REMOTE CONTROL FOR DIRECT CURRENT TO ALTERNATING CURRENT CIRCUITS
Filed April 28, 1937  2 Sheets-Sheet 1
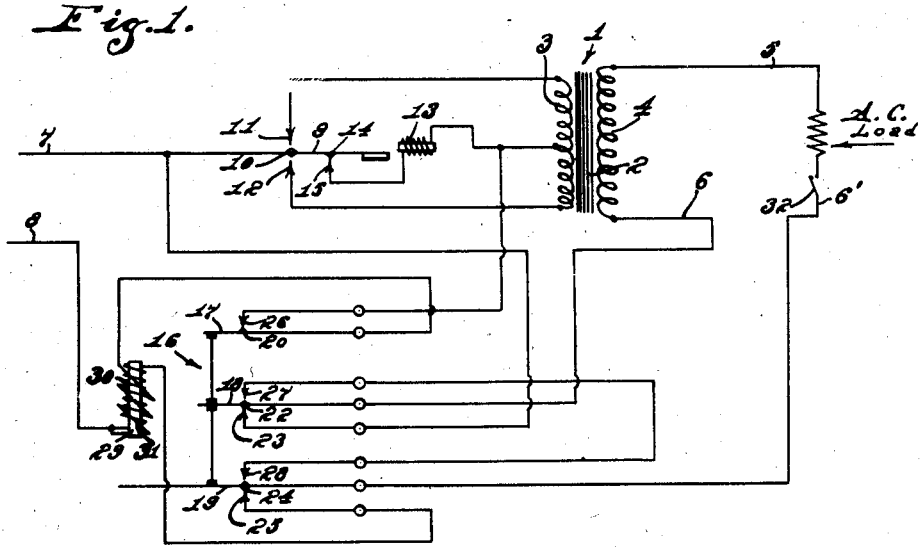
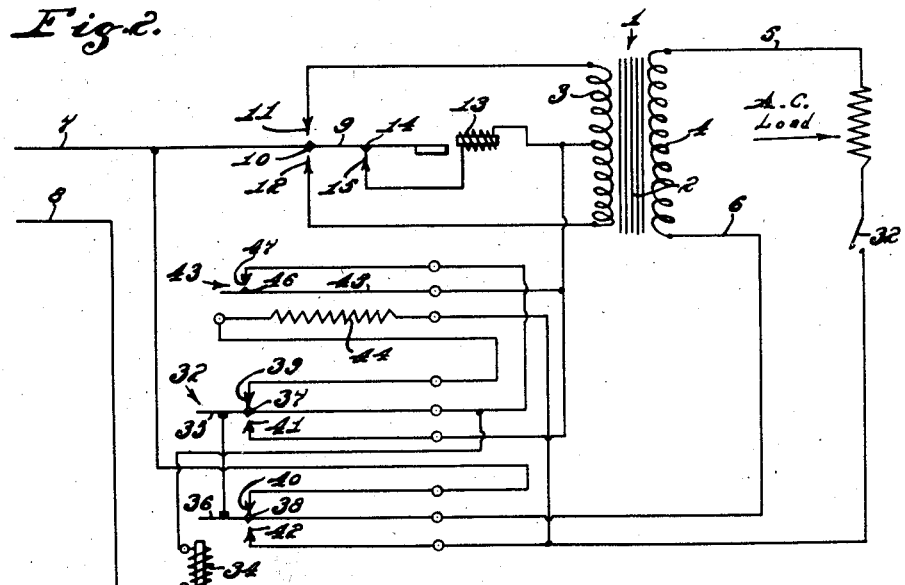
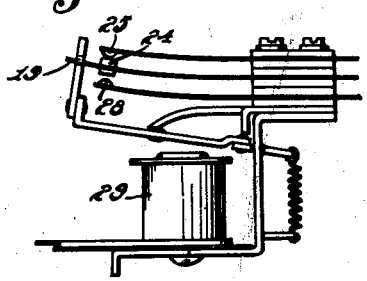
INVENTOR.
William W. Garstang,
BY Hood & Hahn.
ATTORNEYS.

Patented Apr. 26, 1938

2,115,163

UNITED STATES PATENT OFFICE 2,115,163

REMOTE CONTROL FOR DIRECT CURRENT TO ALTERNATING CURRENT CIRCUITS

William W. Garstang, Indianapolis, Ind.

Application April 28, 1937, Serial No. 139,389

7 Claims. (Cl. 175—363)

My invention relates to improvements in converters for converting direct current into alternating current. It has for one of its objects the provision of a device wherein the converter will be automatically set in operation upon the closing of the load circuit.

Heretofore, in the commercial type of converters and particularly in the commercial converters of the vibrator type, there has always been the necessity of throwing a switch in the converter prior to the closing of the switch controlling the load. My present invention is designed to eliminate entirely the switch controlling the converter and to provide a device wherein, upon the closing of the switch controlling the load circuit, the converter will be automatically set in operation. This is particularly advantageous in such arrangements where the load is widely separated from the converter. For instance, the converters of the type specifically illustrated are particularly adaptable for use in connection with radio receivers. Under these circumstances, the converter proper may be, and usually is, mounted closely adjacent the source of direct current power, such for instance as a battery or the like, and the radio receiver and switch for controlling the same is mounted at some distant point. It would therefore be impractical to have to first operate a switch controlling the converter and then operate a switch controlling the radio receiver. My invention is specifically applicable to converters of the so-called vibrator type but may be used with rotary converters or converters using tubes.

For the purpose of disclosing my invention, I have illustrated certain embodiments thereof in the accompanying drawings, in which:

Fig. 1 is a diagrammatic view of a circuit arrangement of a converter embodying my invention;

Fig. 2 is a diagrammatic view of a modification thereof;

Fig. 3 is an elevation of the type of relay which is used in my invention; and

Figure 4:
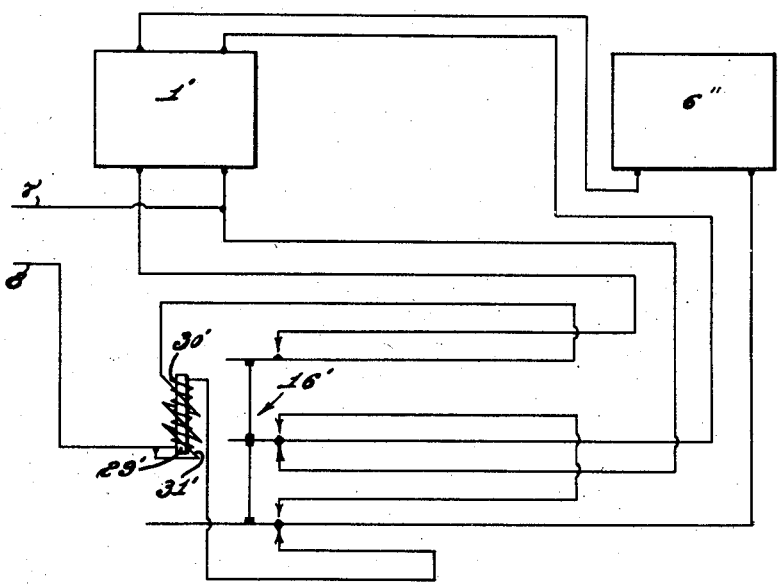
Fig. 4 is a diagrammatic view of a still further modification of my invention.

In the embodiment of the invention illustrated in Fig. 1, I provide a transformer 1 having the usual iron core 2, the center tapped primary winding 3 and the secondary winding 4 which is adapted to be connected by conductors 5 and 6 to any desired load. This transformer is adapted to convert direct current delivered from the direct current supply lines 7 and 8 into alternating current which is delivered to the output lines 5 and 6'. To this end, I provide a vibrator which includes a vibrating reed 9 having a contact 10 adapted to alternately engage stationary contacts 11 and 12. This vibrator is provided with an electromagnet, the winding 13 of which is adapted to set the reed 9 into motion and the circuit of which is controlled through the medium of a contact 14 on the vibrator reed and a stationary contact 15.

In addition to the vibrator above described, I provide a relay 16 having a plurality of switch arms 17, 18 and 19 normally in the position indicated, wherein the contact 20 of the arm 17 is normally out of engagement with the stationary contact 26. The contact 22 of the arm 18 is in engagement with the stationary contact 23 and the contact 24 of the arm 19 is in engagement with the stationary contact 25. When moved in the opposite direction the contacts 20, 22, and 24 will respectively engage stationary contacts 26, 27, and 28. The relay arms are connected together but insulated from one another so that they will act in unison and are moved from the position illustrated to the second position through the instrumentality of an electro-magnet 29 provided with a potential coil 30 and a current coil 31. Each of these coils is connected at one terminal to one side 8 of the direct current line.

With the construction above described and the circuit connections as illustrated, as soon as the load circuit is closed as by the closing of the load switch 32, current will pass from one side 8 of the direct current line through the potential winding 30 of the relay magnet, across contacts 24 and 25, through the load and the secondary winding 4 of the transformer and thence across contacts 22 and 23 to the opposite side 7 of the direct current line. Immediately upon the closing of this circuit the relay 16 will be operated, closing contacts 24 and 28, 22 and 27, and 20 and 26. This then establishes a circuit through the current winding 31 of the relay magnet 29 which is in the primary winding circuit of the transformer and in the circuit of the winding 13 of the vibrator magnet and therefore maintains the relay switch in its closed or second position. Upon the closing of the contacts 20 and 26 the vibrator circuit is established so that the reed 9 will be caused to alternately engage contact 10 with contacts 11 and 12, closing the circuit through the respective sections of the primary winding in opposite directions.

At the same time that contacts 20 and 26 are closed, contacts 22 and 27 and 24 and 28 are closed, thereby cutting the potential coil 30 out of the circuit of the secondary winding 4 but maintaining the circuit of the secondary winding closed. The device thus continues to operate as long as the load switch remains closed. However, as soon as the load switch is opened and the load demand on the transformer is reduced to zero, the current demand on the part of the transformer is so reduced that sufficient current will not be passed through the current coil 31 to maintain the relay in its closed position. As a result, the relay switch arms 17, 18 and 19 will be restored to their initial position ready to be operated again. The current coil may be adjusted so that the current demand thereof, for the same to be operative, will always be smaller than the current demand of the converter circuit when operating under no load conditions and, therefore, restoration of the relay to its initial position may be insured upon the removal of the alternating current load from the transformer.

In the structure illustrated in Fig. 2, I have dispensed with a potential coil for initially operating the circuit control relay to close the circuit through the current coil of the relay magnet, as in Fig. 1. In this structure, I provide the relay 32 which is operated by the magnet 33 having the current coil 34. This relay is provided with the switch arms 35 and 36 respectively provided with contacts 37 and 38 normally in engagement with stationary contacts 39 and 40 and adapted to be moved into engagement with the stationary contacts 41 and 42. In addition to the above mentioned relay, I provide a thermostatically controlled relay 43 including the heating element 44 and a bi-metallic switch arm 45 having a contact 46 adapted to engage the contact 47.

When circuit is initially closed through the load by the switch 32, a small amount of direct current will pass through the current relay winding 34 and the load including the secondary winding 4 of the transformer. This circuit includes the heating element 44 and the element 44, as a result, will heat up sufficiently to cause a movement of the bi-metallic switch arm 45 to close the circuit through contacts 46 and 47. This immediately provides a short circuit across contacts 41 and 37, thereby establishing a circuit through the current coil 34 of the relay independent of the thermostatic control relay, thereby actuating magnet 33, causing relay arms 35 and 36 to engage the contacts 34 and 41 and 38 and 42 and at the same time establishing a circuit through the vibrator and the secondary windings 3 so that the converter will operate in the usual manner. At the same time, the heating coil 44 is cut out of the load circuit through the engagement of the contacts 38 and 42 and the secondary circuit will be established independent of the relay 43.

It is quite obvious that the transformer 1 may be used for an A. C. to A. C. conversion instead of, as is illustrated, a D. C. to an A. C. conversion. In this instance of course the vibrator and its associated parts would be dispensed with or, if desired, instead of a transformer, as is illustrated in Fig. 1, a converter may be used for changing the frequency of an A. C. to A. C. conversion.

In the arrangement illustrated in Fig. 4, I have illustrated my controlling switch in connection with a converter which may be of any type, including a rotary converter and in connection with a device requiring alternating current for its operation. In this structure the converter is diagrammatically shown at 1' and the A. C. load is diagrammatically shown at 6''. The electromagnet 29', as in the arrangement illustrated in Fig. 1, is provided with a potential coil 30' and a current coil 31'. The switch member 16' is the same as is illustrated in the arrangement illustrated in Fig. 1. As soon as the circuit is closed through the A. C. load device 6'' current will pass through the potential winding 30', through the A. C. load device, through the secondary side of the converter, across the second normally closed switch and to the opposite side of the line. Immediately upon the closing of this circuit the relay 16' will be operated opening the normally closed contacts and closing the normally open contacts thereby establishing a circuit through the current coil 31, through the primary of the converter 1' and to the opposite side of the line. At the same time, the secondary of the converter will be connected with the A. C. load.

I claim as my invention:

1. The combination with a direct current source of supply and an alternating current load circuit, of a converter for converting said direct current into alternating current and supplying said alternating current circuit, said load circuit being initially connected with the direct current source through a portion of said converter and means operable upon the closing of the load circuit for connecting said converter with the source of direct current and divorcing the load circuit from said direct current source.

2. The combination with a direct current source of supply and an alternating current load circuit, of a converter for converting said direct current into alternating current and supplying said alternating current circuit and including a secondary winding circuit, the secondary winding of said converter and the alternating current circuit being initially connected with the source of direct current and means operable upon the closing of the alternating current circuit for connecting the primary side of said converter with the direct current source and divorcing the alternating current circuit and secondary winding from said direct current source.

3. The combination with a source of direct current, of a circuit adapted for operating an alternating current load, a converter for converting said direct current into alternating current and delivering the same to the alternating current circuit, a relay switch, an electromagnet for operating said switch, an operating circuit for said electromagnet including said direct current source and said relay switch, a portion of said converter and said alternating current circuit, a holding circuit for said electromagnet connected to said direct current source independent of said alternating current circuit, said operating circuit being closed upon the closing of the alternating current circuit and said relay switch upon being actuated by said electromagnet, connecting said converter with the source of direct current and establishing said holding circuit for the electromagnet and disconnecting said alternating current circuit from said source of direct current.

4. The combination with a source of direct current, with a transformer including a secondary winding delivering alternating current to an alternating current circuit and a primary adapted to be connected through a vibrating switch to the direct current source, a relay switch for controlling the connection of said primary circuit with the direct current source, an electromagnet for operating said relay switch, said electromagnet having an operating circuit including the alternating current circuit and the secondary of said transformer, and a holding circuit adapted for connection with said direct current source, said relay normally connecting said operating circuit with the alternating current circuit to permit said operating circuit to be completed upon the completion of the alternating current circuit and upon the operation of said relay to connect said converter with the direct current supply through said holding circuit.

5. The combination with a transformer, including a primary winding circuit and a secondary winding circuit, said primary winding circuit including a vibrator switch, of a relay including an electromagnet for operating said relay and having a holding circuit and an operating circuit, the operating circuit including a portion of said converter, said relay, when in its normal position, connecting said electromagnet into the operating circuit and when moved from its normal position connecting said primary circuit with a source of direct current supply and connecting said holding circuit with a source of supply.

6. The combination with a direct current source of supply and an alternating current load circuit, of a converter for converting said direct current into alternating current and supplying said alternating current circuit, said load circuit being initially connected with the direct current source through a portion of said converter, and means operable upon the closing of the load circuit for connecting said converter with a source of direct current and divorcing said load circuit from said direct current source, said means being so constructed as to be restored to normal condition upon the opening of said load circuit.

7. The combination with a transformer including a primary winding circuit and a secondary winding circuit, said primary winding circuit including a vibrator switch, of a relay including an electromagnet for operating said relay and having a holding circuit in the primary winding circuit and an operating circuit in the secondary winding circuit, said relay when in its normal position connecting the electromagnet into the secondary winding circuit and when moved from its normal position connecting said primary circuit with a source of direct current supply and connecting said holding circuit with the primary winding circuit.

WILLIAM W. GARSTANG.